United States Patent [19]
Usami et al.

[11] Patent Number: 5,099,088
[45] Date of Patent: Mar. 24, 1992

[54] MEANS FOR SPLICING WIRES

[75] Inventors: Ikuzo Usami, Kanagawa; Yoshinori Sato, Sagamihara; Manabu Nakamura, Kanagawa; Satoshi Uemura, Hachioji, all of Japan

[73] Assignee: Three Bond Co., Ltd., Tokyo, Japan

[21] Appl. No.: 534,727

[22] Filed: Jun. 7, 1990

[30] Foreign Application Priority Data

Jul. 19, 1989 [JP] Japan .................. 1-187070

[51] Int. Cl.[5] .............. H02G 15/02; H02G 15/08; H01R 4/00
[52] U.S. Cl. .......................... 174/76; 156/49; 174/84 R; 174/87; 174/88 R; 174/92
[58] Field of Search .............. 174/76, 84 R, 87, 88 R, 174/92, 138 F; 156/48, 49

[56] References Cited

U.S. PATENT DOCUMENTS

| | | | |
|---|---|---|---|
| 3,020,260 | 2/1962 | Nelson | 174/52.2 |
| 3,879,575 | 4/1975 | Dobbin et al. | 174/92 |
| 4,550,220 | 10/1985 | Kitchens | 174/138 F |
| 4,555,284 | 11/1985 | Quella et al. | 174/138 F |
| 4,647,717 | 3/1987 | Uken | 174/84 C |
| 4,721,832 | 1/1988 | Toy | 174/87 |
| 4,751,350 | 6/1988 | Eaton | 174/87 |
| 4,849,580 | 6/1989 | Reuter | 174/92 |
| 4,859,809 | 8/1989 | Jervis | 174/92 |
| 4,888,070 | 12/1989 | Clark et al. | 174/76 X |
| 4,943,685 | 7/1990 | Reynaert | 174/76 X |

*Primary Examiner*—Morris H. Nimmo
*Attorney, Agent, or Firm*—Dilworth & Barrese

[57] ABSTRACT

An apparatus for splicing and sealing plural conductive wires comprising a support member and a flexible sealant held in the interior of the support member and a method for splicing and sealing plural conductive wires employing the apparatus are provided.

15 Claims, 6 Drawing Sheets

MEANS FOR SPLICING WIRES

BACKGROUND OF THE INVENTION

The present invention relates to means for splicing conductive wires such as electric wires or lead wires, an automobile wire harnesses, and optical fiber cables.

For examples, as wire harnesses for automobiles there are main harness, side harness, engine sub harness, rear harness, door harness, and instrument harness. These wire harnesses are each constituted by connecting a large number of conductive wires.

The connection of conductive wires is performed, for example, by first removing an insulating coating on each of wires to be connected together, then contacting the resulting open wire portions with each other and connecting them together using a metallic connection terminal, or fusion-welding them directly in a hot state.

The connection of a harness serving as a connecting member is coated for protection with a coating material to prevent corrosion of the metal caused by the entry of water or salt damage which would lead to bad influences such as defective electrical connection or disconnection. According to the protecting method adopted most commonly, a splicing tape such as insulating polyvinyl-chloride tape is used and it is wound round a connection of wires. However, this conventional method involves drawbacks such as poor sealability or difficult handling, requiring skill. For example, in the case of harness, since all of conventional splicing means cannot provide complete waterproofing, a harness is extended up to the room of an automobile to position the connection of the harness in the room in order to prevent defective connection or disconnection caused by the entry of water or salt damage in the connection. But this takes much time an labor for wiring of the harness, and the harness becomes long and heavy; besides, there arises the necessity of ensuring a wide space for the harness, thus leading to increase of the cost.

It is the object of the present invention to permit sealing of a connection of wires in a short time and with few tools required, thereby improving the working efficiency and facilitating the splicing work.

SUMMARY OF THE INVENTION

The present invention resides in a splicing means for a connection of plural wires, which means comprises a support member and a flexible sealant held in the interior of the support member.

DETAILED DESCRIPTION OF THE INVENTION

Figure 1:
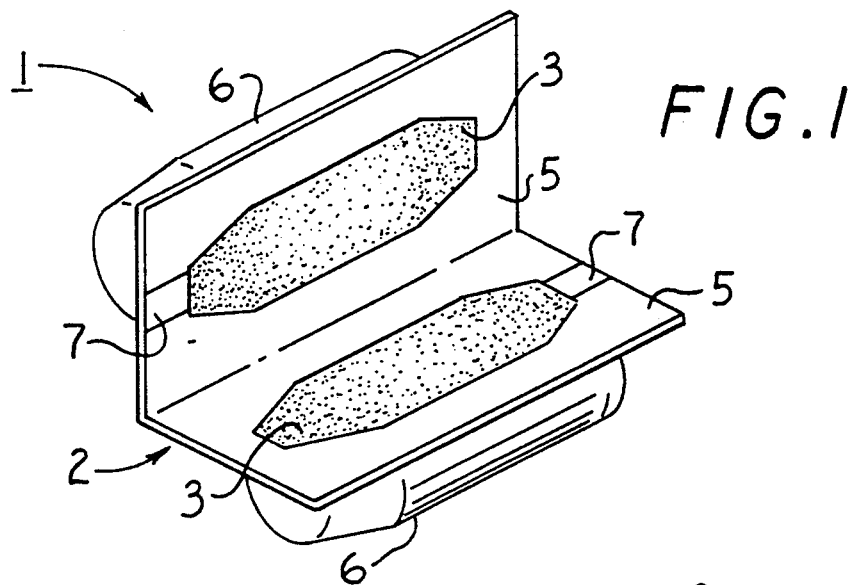
FIG. 1 is a perspective view of a splicing means showing an embodiment of the present invention.

Connections to which the present invention is applicable include connections of wires such as electric wires and lead wires, connections of wire harnesses in automobiles, connection of a conductive wire with a control board for electric equipment, connections of cables in plants, connections of optical fiber cables, and connections of connecting members such as pipes.

According to the present invention, there is provided a support which covers approximately the whole of each such connection, and a flexible sealant typified by a gelled photocurable resin, a foamed hot-melt (resin) and silicone gel is filled into the said support member. As to the sealant, a precursor thereof before gelation or foaming is used and allowed to gel or foam upon coating.

The foamed hot-melt can be obtained by heat-melting a conventional, solid hot-melt resin, then incorporating gas such as $N_2$ or $CO_2$ therein mechanically under certain pressure condition and thereafter discharging this hot-melt through a gun.

As such hot-melt there may be used a hot-melt which contains as a main component any of ethylene vinyl acetate resins, vinyl acetate resins, polyamide resins, polyolefin resins, acrylic resins, polyvinyl chloride resins, ethylene-vinyl acetate copolymer resins, polyethylene resins, polypropylene resins, polybutadiene resins, polyisoprene resins, and polyimide resins, alone or in combination of two or more. The hot-melt agent may contain various additives such as, for example, a plasticizer, a tackifier and a stabilizer.

It is necessary that the hot-melt should maintain its foamed state at least for a time required for coating connected conductors and not harden to the extent of impeding the interposition of the connected conductors in the sealant.

As to the silicone gel (cured tacky silicone gel), the following are mentioned as examples:

1 a silicone composition which is disclosed in U.S. Pat. No. 3,020,260 and which comprises:

(a) a polyorganosiloxane as a base polymer of a substantially linear structure comprising PViSiO unit, $R_2SiO$ unit and $CH_3R_2SiO$ unit and having a viscosity of 100 to 10,000 cSt at 25° C., provided in the above unit formulae R represents methyl and/or phenyl, and Vi represents vinyl;

(b) a liquid polyorganohydrogen siloxane represented by the following general formula and having a viscosity of not higher than 10,000 cSt at 25° C.;

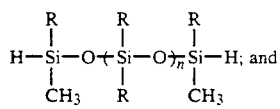

(c) an organosiloxane potting compound constituted by a platinum catalyst.

2 a silicone composition which is disclosed in Japanese Patent Laid Open No. 7452/1983 and which comprises:

(a) a branched vinyl group-containing polymethylsiloxane as a base polymer comprising 80-96.5 mole % $(CH_3)_2SiO$ unit, 2.0-10.0 mole % $CH_3SiO_{1.5}$ unit, 1.25-6.0 mole % $(CH_3)_3SiO_{0.5}$ unit and 0.25-4.0 mole % $(CH_3)_2(CH_2=CH) SiO_{0.5}$ unit;

(b) a polyorganohydrogen siloxane which has more than one silicon-bonded hydrogen atoms per molecule on the average and which is substantially the same as the above component (b); and (c) an organosiloxane potting compound constituted by a platinum catalyst.

3 a curable silicone composition which is dislcosed in Japanese Patent Laid Open No. 280766/1988 and which comprises:

(a) a polymethylhydrogen siloxane comprising 80-97.7 mole % $(CH_3)_2SiO$ unit, 2.0-10.0 mole % $CH_3SiO_{1.5}$ unit, 0.1-1.0 mole % $H(CH_3)_2SiO_{0.5}$ unit and 0.2-9.0 mole % $(CH_3)_3SiO_{0.5}$ unit and having a viscosity of 50 to 10,000 cP at 25° C.;

(b) a polyorganosiloxane having at least 1.5 alkenyl groups per molecule, in an amount selected so that the content of said alkenyl groups is 0.2 to 5.0 moles on the average per mole of the silicon-bonded hydrogen atoms of the polymethylhydrogen siloxane of the above component (a); and (c) a catalyst for addition reaction, in an amount of 0.01 to 50 ppm as the amount of a catalyst metal element relative to the total amount of the components (a) and (b).

As to the photocurable resin gel, examples are mentioned as follows:

1 a composition comprising:

(a) a monomer, oligomer or prepolymer having one or more unsaturated double bonds in the molecule, as a base polymer, e.g. an acrylic resin having (meth)acryloyl in the molecule;

(b) a photopolymerization initiator (a radical polymerization initiator); and (c) a gelling (jellying) agent, e.g. acrylamino acid derivative, sorbitol derivative, or organic bentonite, and a filler, e.g. organic bentonite, asbestos powder, silica powder, or hydrogenated castor oil.

2 a composition comprising:

(a) an epoxy resin having one or more epoxy groups in the molecule, as a base polmer;

(b) a photopolymerization initiator (a cationic polymerization initiator); and (c) same as the above component (c).

When filled into the support member and when cured by heating, the sealant is not deformed nor does it flow. Further, since the sealant itself is highly condensable, by placing a connection of conductive wires in the sealant in the support member and curing the sealant in this state, the connection is coated with the sealant, the coated sealant being superior in compatibility and embedding property with respect to the surface of the connection, with the result that the splicing work is simplified and the connection is sealed in a perfect manner.

Embodiments of the present invention will be described below with reference to the accompanying drawings.

Figure 2:
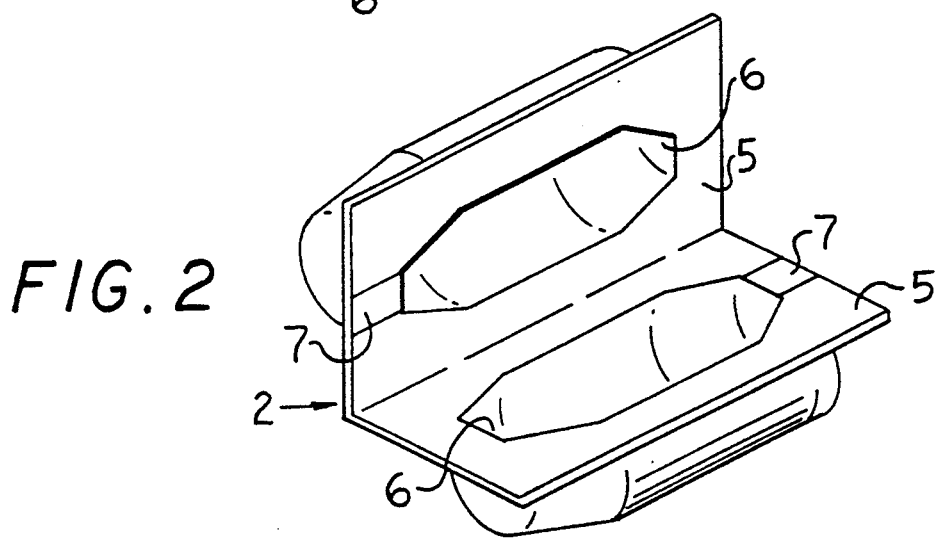
FIGS. 2 to 4 are a perspective view, a plan view and a front view, respectively, of a support member.
Figure 3:
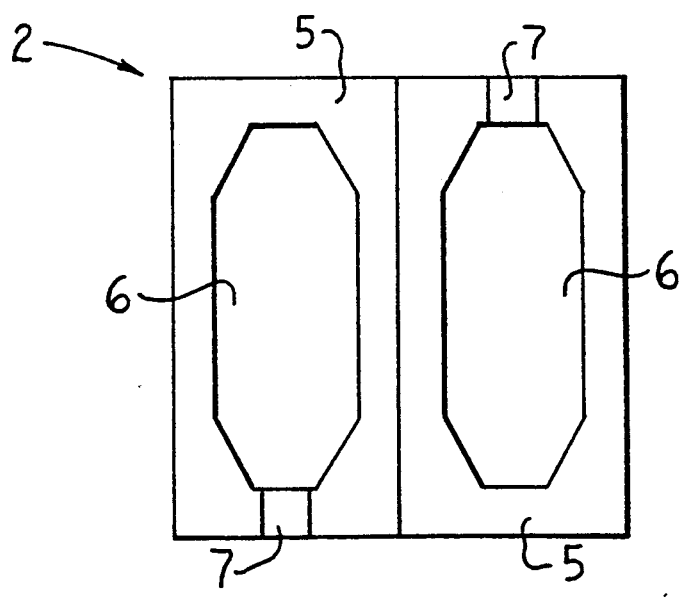
Figure 4:
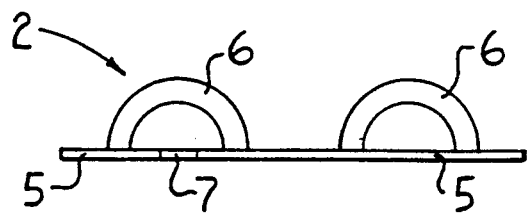

FIG. 1 is a perspective view of a splicing means according to a first embodiment of the present invention. In the same figure, the splicing means, indicated at 1, comprises a support member 2 and a sealant 3 charged in the interior of the support member. The support member 2, as also shown in FIGS. 2 to 4, is constituted by a molded plastic member obtained by vacuum molding of a plastic sheet, e.g. polypropylene sheet. It has a shell structure comprising two shell halves 5, 5 formed integrally for opening and closing motions. Each shell half 5 is formed with a recess 6 (this reference numeral is affixed outside for convenience' sake in FIGS. 1, 3 and 4) for charging the sealant therein. Each shell half 5 is further formed with a bendable portion 7 which is partially cut in so as to be bent when a connection of wires is sandwiched in between the shell halves 5, 5.

The sealant 3 cures after it is filled into the support member 2 and is capable of retaining a gel-like tackiness to the extent of not flowing out from the interior of the support member 2.

Figure 5:
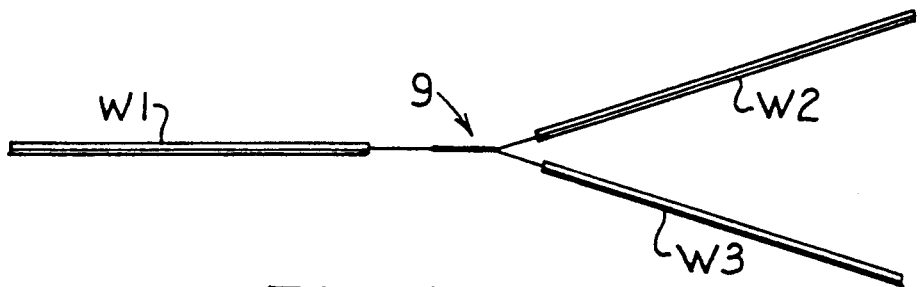
FIG. 5 is a plan view showing example of a connection of wires.

How to splice a connection of wires using the splicing means 1 will now be described, in which there is used, for example, such a connection of wires as shown in FIG. 5. The illustrated connection is obtained by removing insulating coatings from three conductive wires W1-W3 to be connected together, thereby obtaining open wires, then contacting the open portion of the wire W1 with the open portions of the wires W2 and W3, and connecting them together using a metallic connecting terminal to obtain a Y-shaped connection 9.

First, a curable silicone gel as the sealant 3 is formed within the support member 3 to obtain such splicing means 1 as shown in FIG. 1.

Figure 6:
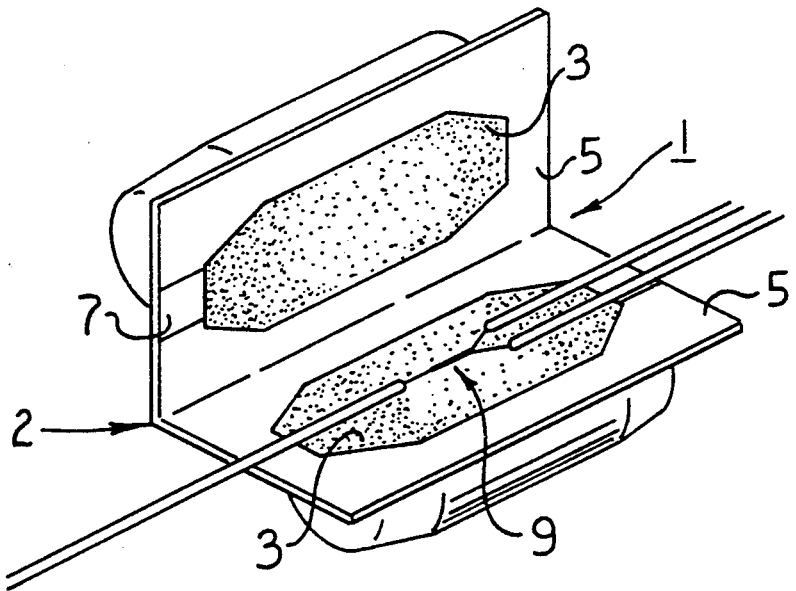
FIGS. 6 to 9 are perspective views for explaining how to splice a connection of wires using the said splicing means.
Figure 7:
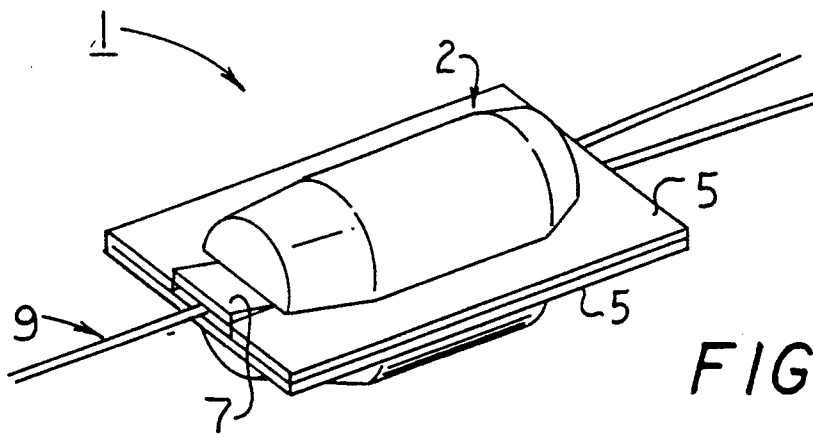
Figure 8:
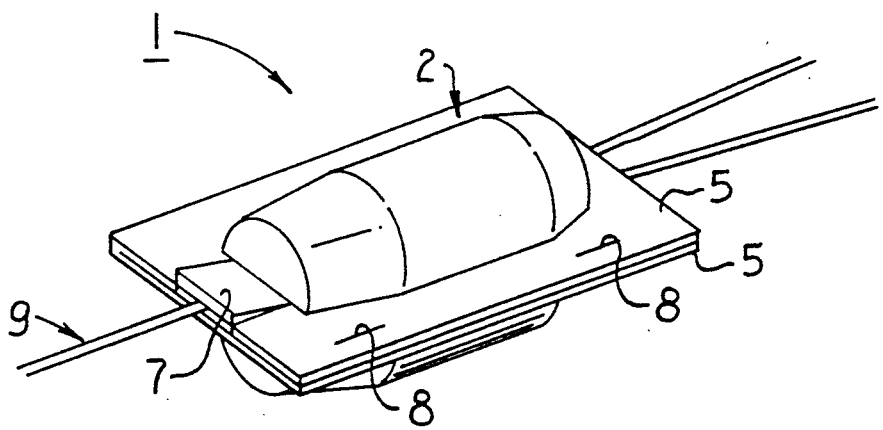

Then, any time during coating for the connection 9, the Y-shaped connection 9 is embedded in the sealant in one shell half 5 of the support member 2 in an open condition of the shell halves 5, 5 of the coating unit 1, as shown in FIG. 6, then the shell halves 5, 5 are closed, whereby the connection 9 is embedded in the sealant 3 charged into the splicing means 1, as shown in FIG. 7. In this case, after closing of the support member 2 the shell halves 5, 5 are integrally fixed with retaining means 8, 8, e.g. staples, as shown in FIG. 8.

At this time, the sealant 3 is pushed away in a amount corresponding to the volume of the connection 9 and moves in the arrowed directions in FIG. 9, getting into the gaps between the conductive wires in the connection 9 in an airtight manner, In the case where a photocurable resin is used as the sealant, ultraviolet ray is radiated subsequently from the exterior of the splicing means 1 now holding the connection 9, using an ultraviolet ray irradiator, under conditions which permit an ultraviolet ray curable resin 3 in the support member 2 to be cured to seal the connection 9 of conductive wires positively. In this way the resin 3 in the support member 2 is cured to coat the connection 9.

When a formed hot-melt is used as the sealant 3, first a solid hot-melt is heat-melted, then gas is incorporated in the hot-melt under pressure, and the hot-melt with gas is discharged into auspport member 2 from a gun, whereby the gas foams and the hot-melt 3 thus foamed is charged into the support member 2.

When the temperature of the foamed hot-melt in the splicing means 1 becomes room temperature, the hot-melt 3 cures to coat the connection 9.

Figure 10:
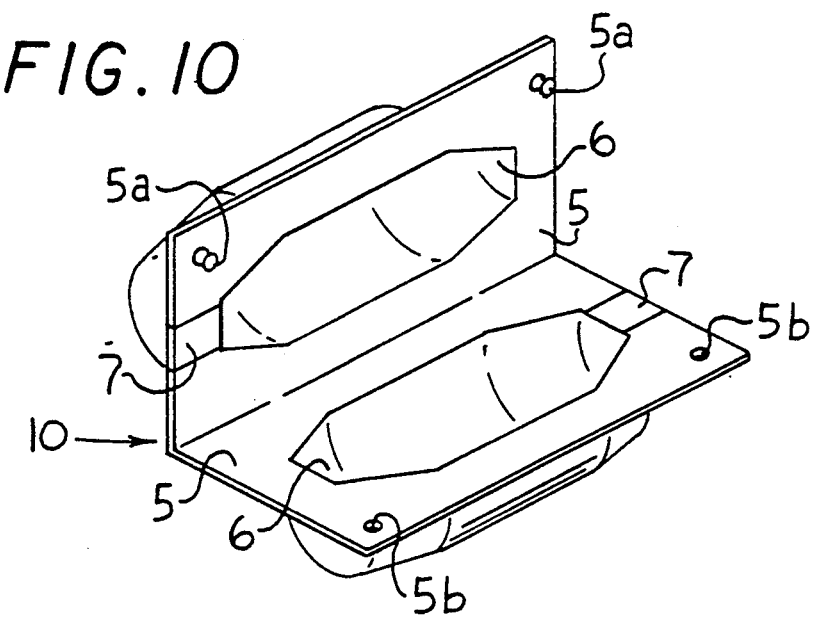
FIG. 10 is a perspective view showing another example of a support member.

FIG. 10 is a perspective view showing another example of a support member of the splicing means 1. This support member, indicated at 10, has, in addition to the same structure as that of the support member 2 described above, convexes 5a, 5a and concaves 5b, 5b in opposed positions of the surface of the shell halves 5, 5 so that when the shell halves 5, 5 are closed, the convexes 5a, 5a are fitted in the concaves 5b, 5b to effect locking into a closed state.

Thus, by providing the shell halves of the support member having a shell structure with such locking mechanism so that the shell halves are locked into a closed state upon closing of the support member, it is possible to easily effect temporary locking of closing the shell halves of the support member.

Figure 11:
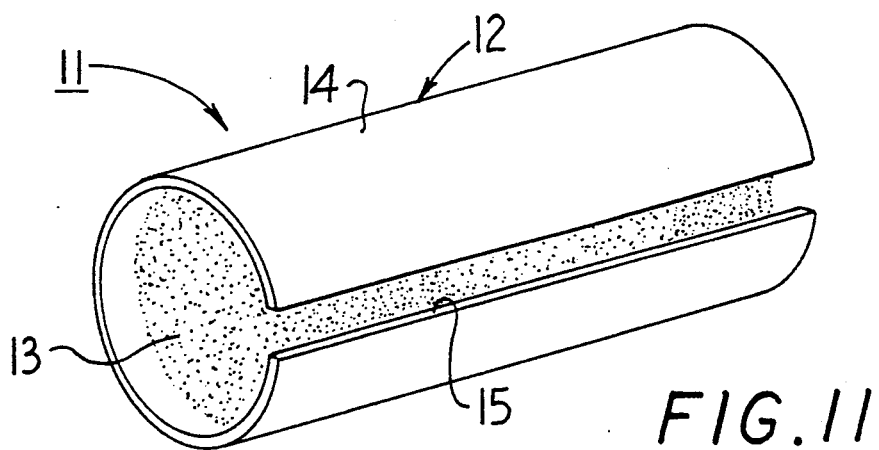
FIG. 11 is a perspective view of a splicing means, showing another embodiment of the present invention.

FIG. 11 is a perspective view of a splicing means according to a second embodiment of the present Invention.

Figure 12:
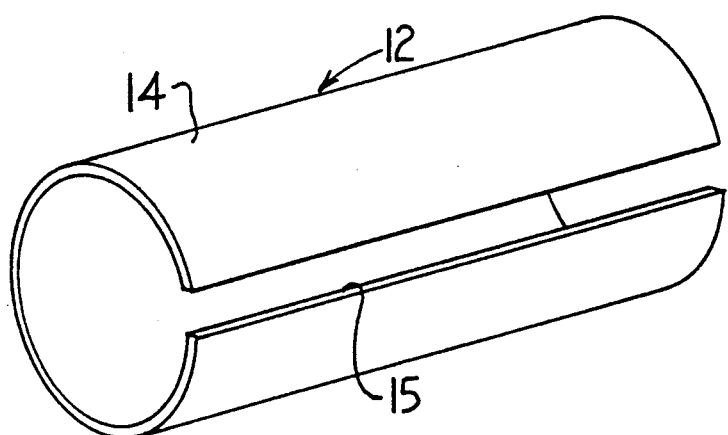
FIG. 12 is a perspective view showing a support member used therein.

This splicing means, indicated at 11, comprises a support member 12 and a sealant 13 filled into the support member 12. As shown in FIG. 12 for example, the support member 12 is constituted by a cylindrical body 14 both ends of which are open, with a slit 15 being formed longitudinally in a side portion of the cylindrical body 14 for fitting a connection of wires therein or for charging the sealant 13 therethrough.

In the support member 12, a side portion of the cylindrical body 14 may be cut a single line axially so that the slit 15 is formed by the expanding force of the cylindrical body 14. The shape of the slit 15 is not specially limited if only a connection of wires can be introduced into the support member 12 and the sealant 13 can be held within the support member.

The method for coating a connection of wires using the splicing means 11 will now be described. First, the interior of the support member 12 is filled with the sealant 13 to form such splicing means 11 as shown in FIG. 11.

Figure 13:
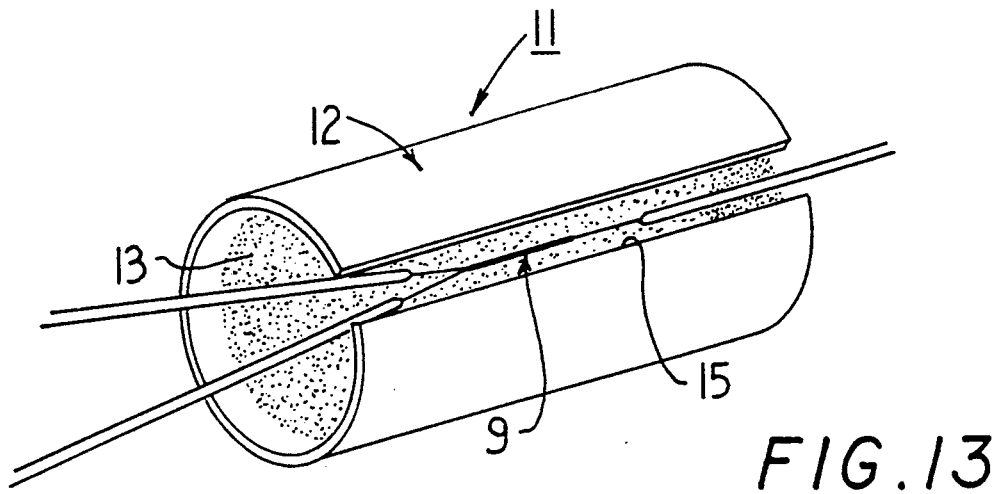
FIG. 13 is a perspective view for explaining how to splice a connection of wires using the said splicing means.

Then, any time during the splicing operation for the connection 9, such Y-shaped connection 9 as shown in FIG. 5 for example is embedded into the sealant 13 in the splicing means 11 through the slit 15 of the support member 12 of the splicing means 11 to cover the connection 9, as illustrated in FIG. 13. This method is suitable for splicing wires relatively small in diameter.

Figure 14:
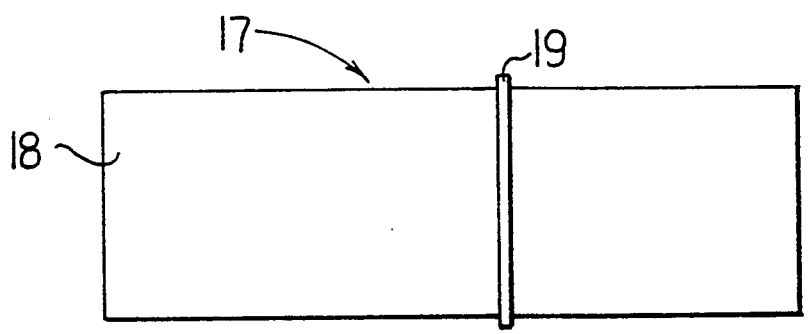
FIGS. 14 to 16 are a front view showing another example of a support member and section side views showing different states thereof.

FIG. 14 is a front view showing another example of a support member of the splicing means 11.

Figure 15:
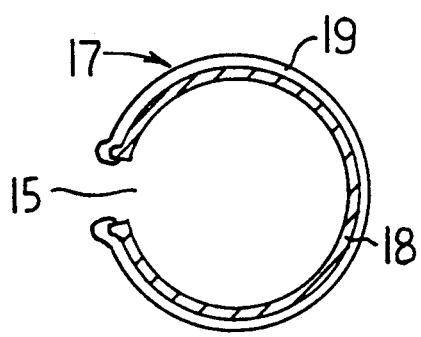

This support member, indicated at 17, comprises a cylindrical body 18 having a single cut-in portion formed axially thereof and a ring 19 fitted on the outer periphery of the cylindrical body 18 so as to be engaged with the cut ends of the cylindrical body, thereby expanding the cut ends to form a slit 15, as shown in FIG. 15.

Figure 16:
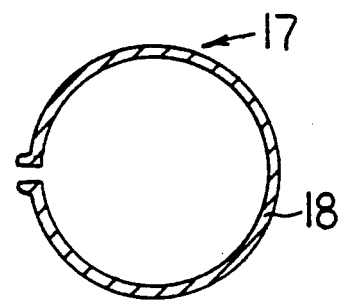

In the support member 17, upon removal of the ring 19, the cylindrical body 18 closes by virtue of its own restoring force to close the slit 15, as shown in FIG. 16. Therefore, by removing the ring 19 after a connection of wires is embedded in the sealant in the support member 17, the slit 15 is closed and the sealant is thereby held in the interior of the support member, so that the working efficiency is improved. The ring 19 may be attached to the tool side.

Figure 17:
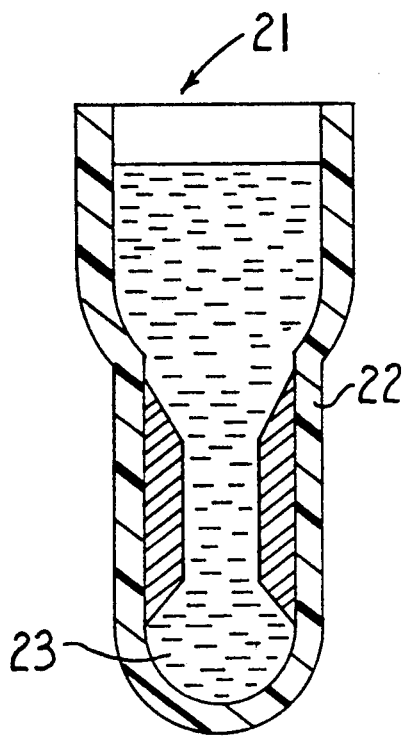
FIG. 17 is a perspective view of a splicing means, showing a further embodiment of the present invention.

FIG. 17 is a sectional view of a coating unit according to a third embodiment of the present invention.

Figure 18:
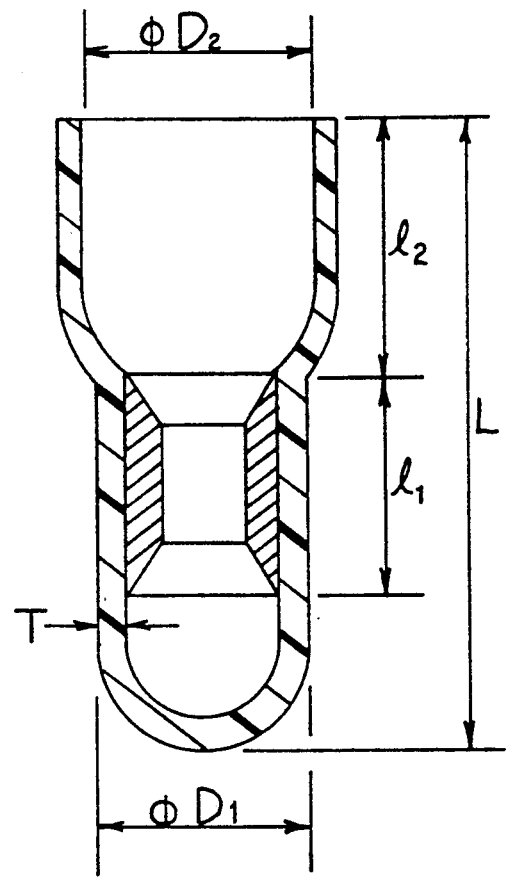
FIG. 18 is an explanatory view showing a support member used therein.

This splicing means, indicated at 21, comprises a support member 22 and a sealant 23 filled into the support member. The support member 22 is a U cup-shaped closed-end connector (hereinafter referred to simply as the "connector") made of a thermoplastic resin such as nylon. The connector used herein is defined by JIS-C-2807 (Closed-End Connector with Insulating Coating). In this connector, the dimensions of various portions shown in FIG. 18 are defined as follows:

| Symbol CE | | | |
|---|---|---|---|
| Designation 1 | | | |
| Dimensions: | $\phi D_1$: | | 5.3 |
| | $\phi D_2$: | | 6.0 |
| | T: | | 0.8 |
| | L: | | 22.0 |
| | $l_1$: | | 6.0 |
| | $l_2$: | | 8.0 |
| Pressure-bonding tool die symbol: 1 | | | |
| Designation 2 | | | |
| Dimensions: | $\phi D_1$: | | 6.0 |
| | $\phi D_2$: | | 7.5 |
| | T: | | 0.8 |
| | L: | | 23.0 |
| | $l_1$: | | 6.5 |
| | $l_2$: | | 9.0 |
| Pressure-bonding tool die symbol: 2 | | | |
| Designation 5 | | | |
| Dimensions: | $\phi D_1$: | | 7.6 |
| | $\phi D_2$: | | 9.0 |
| | T: | | 0.8 |
| | L: | | 30.0 |
| | $l_1$: | | 7.0 |
| | $l_2$: | | 10.0 |
| Pressure-bonding tool die symbol: 5 | | | |
| Designation 8 | | | |
| Dimensions: | $\phi D_1$: | | 10.0 |
| | $\phi D_2$: | | 10.5 |
| | T: | | 0.8 |
| | L: | | 30.0 |
| | $l_1$: | | 8.0 |
| | $l_2$: | | 11.0 |
| Pressure-bonding tool die symbol: 8 | | | |

Figure 19:
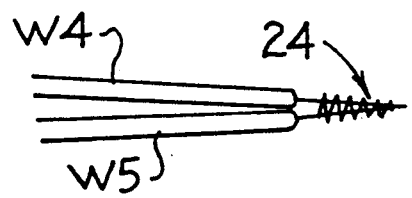
FIG. 19 is a plain view showing an example of a connection of wires.

The following description is now provided about the method for splicing wires using this splicing means 21. For example, this connection is a V-shaped connection 24, as shown in FIG. 19, obtained by removing insulating coatings of two wires W4 and W5 to be connected together, then contacting the resulting open portions of the conductive wires W4 and W5 with each other, followed by twisting and connecting together.

First, the interior of the support member 22 is filled with the sealant 23 to form the splicing means 21, as shown in FIG. 17.

Then, any time during the splicing operation for the connection 24, the connection 24, which is U-shaped, is embedded into the sealant 23 in the wire 22 which is the support member of the splicing means 21. After it was confirmed that the connection 24 was located within the connector 22 and that the insulating coatings of the two wires W4 and W5 were coated with the sealant 23, the connector 22 is pressure-bonded from the outside using a pressure-bonding tool of any of the foregoing symbols conforming to the shape of the connector.

Thus, in the splicing means according to the present invention, since the sealant having tackiness is filled into the support member, all that is required is only placing the connection of wires in the sealant followed by setting and fixing, whereby the splicing work is simplified and speed-up is attained. More particularly, in the splicing work for a connection of lead wires or the like, the splicing means of the present invention meets the recent demand for high working efficiency and speed-up in operations using robots, although the functions required somewhat differ depending on the use, etc. of wires.

As examples of connections capable of being spliced with the splicing means of the present invention there are mentioned connections of wires such as electric wires and lead wires, connection of wire harnesses in automobiles, connections of conductive wires with a control board for electric equipment, connections of cables in plants, etc., connections of optical fiber cables, and connections of pipes.

The support member as a constituent of the splicing means of the present invention is not limited to any of those described in the above embodiments. Preferably, the support member has a structure capable of holding the sealant in the interior thereof, preventing drop-out of a connection of conductive wires inserted therein, and easily passing through a narrow space or a hole.

Examples of the present invention will be described below.

EXAMPLES 1 AND 2

Such a splicing means as shown in FIG. 1 was formed by filling the interior of a support member with silicone gel. The following methods were adopted for the formation of the support member, cured silicone gel, and splicing means.

[Support Member]

In each of Examples 1 and 2, using a 0.8 mm thick polypropylene sheet (a product of Dainippon Ink and Chemicals, Incorporated), there was formed such a shell-like support member 2 as shown in FIG. 1 by a vacuum forming method.

[Cured Silicone Gel and Splicing Means]

Using the following components A and B and proportions (1) in Example 1 and (2) in Example 2, the components A and B in each Example were mixed together homogeneously with stirring and defoamed, then about 1.5 g of the resulting mixed resin was filled into the recesses 6 of the shell halves 5, 5, and held at 80° C.±1° C. for 40 minutes, thereby allowed to cure, to obtain a cured silicone gel 3. In this way there was formed a splicing means 1. The cured silicone gel 3 was obtained also when the mixed resin was held at 25° C.±1° C. for 24 hours, (1) Manufactured by The Shin-etsu Chemical Industry Co., Ltd.
  KE-1051  Component A  100 parts by weight
           Component B  100 parts by weight
(2) Manufactured by the same company:
  KE-1052  Component A  100 parts by weight
           Component B  100 parts by weight

[Embedding of Connection]

A connection of wires was embedded in each of the splicing means 1 obtained in the above Examples 1 and 2.

As the connection there was used a connection of conductive wires (trade name: TR-64×10, a product of Shinagawa Densen K. K.) connected together. A polyvinyl chloride coating layer on the tip end portion of each of two such conductive wires was cut out about 100 mm and then the resulting open wire portions were bonded together by soldering or by electric heat welding to obtain such a Y-shaped connection 9 a shown in FIG. 9.

Figure 9:
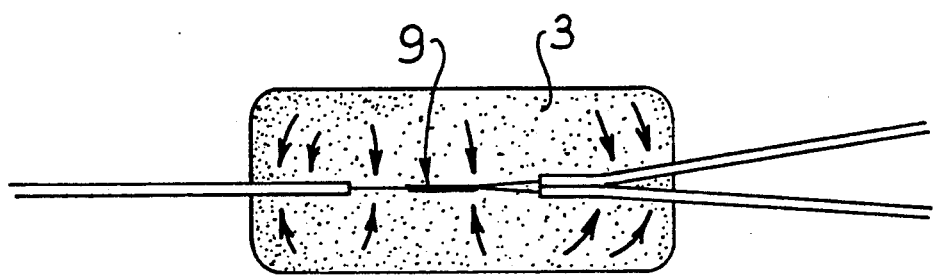

The Y-shaped portion of the connection 9 was embedded in the cured silicone gel 3 charge din one shell half 5 of the support member 2 of the coating unit 1, then the other shell half 5 serving as a lid of the support member 2 is closed, allowing the Y-shaped connection 9 to be embedded in the cured silicone gel 3, whereby the cured silicone gel 3 is pushed away in an amount corresponding to the volume of the connection 9, moves in the arrowed directions in FIG. 9 and gets into gaps formed in the connection 9.

At this time, since the cured silicone gel 3 has surface tackiness, the shell halves 5, 5 of the support member 2 were closed and fixed together at two points using two steel staples SL-10 to thereby ensure adhesion.

The connection of wires sealed by the splicing means 1 in Example 1 was subjected to the following evaluation test, the results of which are as set forth in Table 1.

WORKING EFFICIENCY

The time required for splicing the connection 9 was measured.

SEALABILITY TEST

At the time of embedding the connection 9 in the splicing means 1, five grains of Hishipearl type A (trade name of Asahi Glass Company, Limited) (2 mm in diameter), as spherical silica gel desiccant grains for packaging use, were fixed to the connection 9, then the shell half 5 serving as a lid of the support member 2 was closed, and the connection 9 was subjected to a coating treatment in the same manner as in Examples 1 and 2. In this way there were prepared selability test samples.

Then, the samples were immersed in water at an ordinary temperature for 24 hours, and thereafter whether the silica gel was discolored or not was checked. In this case, the sample in which the silica gel was not disclosed was judged to be good in sealability, while the sample with discolored silica gel was judged to be lacking in sealability.

TABLE 1

|  | Example | |
| --- | --- | --- |
|  | 1 | 2 |
| Workability | 1-2 sec | 1-2 sec |
| Sealability | good | good |

EXAMPLES 3 AND 4

The interior of a support member was filled with silicone gel to from such a splicing means 11 as shown in FIG. 11. The support member, cured silicone gel and splicing means were prepared in the following manner.

[Formation of Support Member, Cured Silicone Gel, and Splicing Means]

Using the following components A and B and proportions (3) in Example 3 and (4) in Example 4, the components A and B in each Example were mixed together homogeneously with stirring and defoamed, then about 1.5 g of the resulting mixed resin was poured into a cylindrical body 14 formed by sealing one opening end of a polypropylene tube (a product of Yamaichi Kako K. K.), and held at 80° C.±1° C. for 40 minutes, thereby allowed to cure, to obtain a cured silicone gel 13. The cylindrical body 14 with the silicone gel 13 cured therein was cut into the length of 4 cm, and a single cut was made axially in a side part of the cylindrical body after the cutting to obtain a support member 12 having a slit 15. In this way there were formed splicing means 11.

(3) Manufactured by The Shin-etsu Chemical Industry Co., Ltd.:
 KE-1051 Component A 100 parts by weight
 Component B 100 parts by weight
(4) Manufactured by Toray Silicone Co., Ltd.:
 SE-1885 Component A 100 parts by weight
 Component B 100 parts by weight

[Embedding of Connection]

Next, a connection of wires was embedded as follows in each of the splicing means 11 obtained in Examples 3 and 4.

A Y-shaped connection 9 similar to that used in Example 1 was pushed through the slit 15 into the cured silicone gel charged in the support member 12 in the splicing means 11 to coat the connection 9.

The connection 9 coated with the coating units 11 obtained in Examples 3 and 4 were subjected to the same evaluation test as in Example 1, the results of which are as set forth in Table 2.

TABLE 2

| | Example | |
|---|---|---|
| | 3 | 4 |
| Workability | 2-3 sec | 2-3 sec |
| Sealability | good | good |

EXAMPLES 5 AND 6

Such a splicing means 21 as shown in FIG. 27 was formed by filling the interior of a support member with silicone gel. The support member, cured silicone gel and splicing means were prepared in the following manner.

[Support Member]

In both Examples 5 and 6 there was used the foregoing support member (connector) 22 of designation 5 defined by JIS-C-2807.

[Formation of Cured Silicone Gel and Splicing Means]

Using the following components A and B and proportions (5) in Example 5 and (6) in Example 6, the components A and B in each Example 6 were mixed together homogeneously with stirring and defoamed, then about 1.5 g of the resulting mixed resin was charged into the support member 22 and held at 80° C.±1° C. for 40 minutes, thereby allowed to cure, to obtain a cured silicone gel 23. In this way there were formed splicing means 21.

(5) Manufactured by The Shin-etsu Chemical Industry Co., Ltd.
 KE-1051 Component A 100 parts by weight
 Component B 100 parts by weight
(6) Manufactured by Toshiba Silicone Co., Ltd.
 KSE-3062 Component A 100 parts by weight
 Component B 100 parts by weight

[Embedding of Connection]

Next, a connection of wires was embedded as follows in the splicing means 21 obtained in Examples 5 and 6.

As the connection there was used a connection of conductive wires (trade name: TR-64×10, a product of Shinagawa Densen K. K.) connected together. A polyvinyl chloride coating layer on the tip end portion of each of two such wires was cut out about 10 mm and then the resulting open wire portions were bonded together by soldering or by electric heat welding to obtain such a V-shaped connection 24 as shown in FIG. 19.

Figure 20:
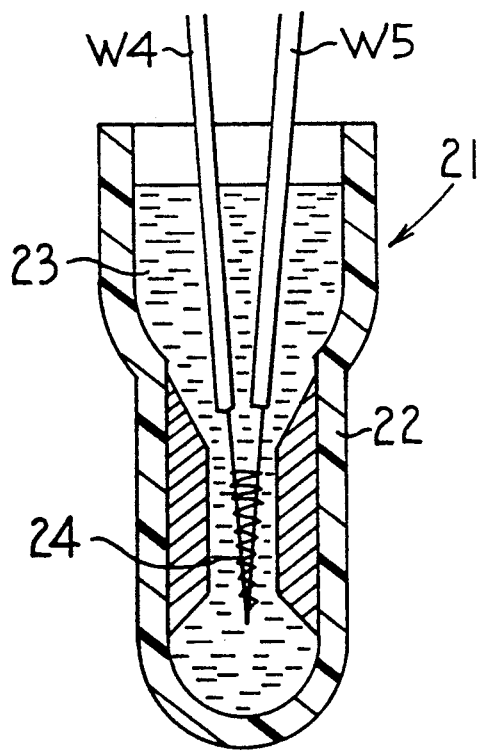
FIG. 20 is a perspective view for explaining how to splice a connection of wires suing the said coating unit.

Then, the V-shaped connection 24 was pushed into the cured silicone gel 23 in the connector 22 as the support member of each coating unit 21, as shown in FIG. 20. After it was confirmed that the connection 24 was located within the connector 22 and that the insulating coating portion of each of the two conductive wires was coated with the cured silicone gel 23, the connector 22 was compression-bonded from the outside using a compression-bonding tool conforming to the shape of the connector 22.

The connector 24 coated with the splicing means 21 obtained in Examples 5 and 6 were subjected to the same evaluation test as in Example 1, provided the number of the silica gel desiccant grains was 2 to 3, the results of which are as set forth in Table 3.

TABLE 3

| | Example | |
|---|---|---|
| | 5 | 6 |
| Workability | 1-2 sec | 1-2 sec |
| Sealability | good | good |

EXAMPLE 7

A splicing means was formed by filling the interior of a support member with an ultraviolet-ray curable resin composition. The support member and the ultraviolet-ray curable resin composition were prepared by the following methods.

(Support Member)

The same support member as that used in Example 1 was used. As polypropylene there was used one with no ultraviolet ray absorber incorporated therein.

(Ultraviolet-Ray Curable Resin)

As the sealant 3 there was prepared an ultraviolet-ray curable resin composition using the following components and proportions:

| | |
|---|---|
| Bisphenol A type epoxy resin (trade name: Cylacure UVR-6405, a product of U.C.C. Co.) | 60 parts by weight |
| Alicyclic epoxy resin (trade name: Cylacure UVI-6110, a product of U.C.C. Co.) | 40 parts by weight |
| Allyl sulfonium salt (trade name: Cylacure UVI-6974 a product of U.C.C. Co.) | 0.8 parts by weight |
| Siloxane compound (trade name: KBM 703, a product of The Shin-etsu Chemical Industry Co., Ltd.) | 4 parts by weight |
| Benzsorbitol derivative (trade name: Gelol D, a product of Shin Nippon Rika) | 1.5 parts by weight |

The ultraviolet-ray curable resin composition was obtained by mixing the above components in the proportions homogeneously with stirring.

(Formation of Splicing Means)

About 1.5 g (about 1.36 cc) of the ultraviolet-ray curable resin composition 3 was charged into the recess 6 of each shell half 5 of the support member 2 at 90°–100° C. and was allowed to stand until the temperature dropped to room temperature, wherey it was jellied to form a splicing means 1. The ultraviolet-ray curable resin composition may be forcibly cooled into jelly.

(Embedding of Connection)

A connection of wires was embedded as follows in the splicing mean 1 obtained above.

As the connection there was used a connection of conductive wires (trade name: TR-64×10, a product of Shinagawa Densen K. K.) connected together. A polyvinyl chloride coating layer on the tip end portion of each of two such wires was cut out about 10 mm and the resulting open wire portions were bonded together by soldering or by electric heat welding to obtain such a Y-shaped connection 9 as shown in FIG. 5.

The Y-shaped connection 9 was embedded in the jellied, ultraviolet-ray curable resin composition 3 charged in one shell half 5 of the support member 2 of the splicing means 1. Thereafter, the other shell half 5 serving as a lid portion of the support member 2 was closed, allowing the Y-shaped connection 9 to be embedded in the jellied, ultraviolet-ray curable resin composition 3, whereby the resin composition was pushed away in an amount corresponding to the volume of the connection 9 and moves in the arrowed directions in FIG. 9, getting into gaps formed in the connection 9.

At this time, the two shell halves 5, 5 of the support member 2 were closed and fixed at two points with steel staples SL-10, as shown in FIG. 8.

Subsequently, ultraviolet ray was radiated to the splicing means 1 holding the connection 9 therein, using an ultraviolet ray irradiator (DHD-500 CM, a product of Ork K. K.), under the irradiation conditions shown in Table 4, to thereby cure the ultraviolet-ray curable resin composition 3 charged in the support member 2 of the splicing means 1.

The connection thus sealed was subjected to the evaluation test, the results of which are as shown in Table 4.

EXAMPLE 8

The interior of the recess 6 of each shell half 5 of a support member 2 formed in the same way as in Example 7 was filled with an ultraviolet-ray curable resin composition 3 which had been prepared in the following manner.

ULTRAVIOLET-RAY CURABLE RESIN COMPOSITION

An ultraviolet-ray curable acrylic resin (TB 3042C, a product of Three Bond Co.) was mixed with a fine silica powder (Aerogil R-972, a product of Nippon Aerogil K. K.) as a gelling agent, at a resin/gelling agent ratio of 85/15, to obtain a jellied, ultraviolet-ray curable resin composition.

Then, the same Y-shaped connection as in Example 7 was embedded in the above jellied, ultraviolet-ray curable resin composition 3 charged in the support member 2 of the splicing means 1. Thereafter, the two shell halves 5, 5 of the support member 2 were fixed and then ultraviolet ray was radiated to the splicing means 1 holding the connection 9 therein under the irradiation conditions set out in Table 4 to cure the ultraviolet-ray curable resin composition 3 in the support member 2.

The connection 9 thus sealed by the coating unit 1 was subjected to the evaluation test, the results of which are as set forth in Table 4.

EXAMPLE 9

A support member 2 and an ultraviolet-ray curable resin composition 3 were prepared in the same way as in Example 7. The resin composition 3 was charged into the recess 6 of each shell half 5 of the support member 2.

Thereafter, in the same manner as in Example 7, the Y-shaped connection 9 was embedded in the jellied, ultraviolet-ray curable resin composition 3 in one shell half 5 of the support member 2. Then, before closing the other shell half 5 serving as a lid portion of the support member 2, ultraviolet ray was pre-radiated to the surface of the resin composition 3, and thereafter the shell half 5 serving as a lid portion of the support member 2 was closed.

This pre-radiation of the ultraviolet ray is performed for the following reason. In photopolymerization of a cationic polymerization system, a dark reaction involving dissociation of a catalyst once irradiated with light proceeds gradually in a dark place, so it is intended that the reaction of the ultraviolet-ray curable resin composition be allowed to proceed sufficiently in a shadow portion or in the interior by the radiation of light after closing of the shell half 5 which serves as a lid portion of the support member 2.

Subsequently, the coating unit 1 now holding the connection 9 was irradiated with ultraviolet light using an ultraviolet ray irradiator (DHD-500CM, a product of Ork K. K.) under the irradiation conditions set out in Table 4 to cure the ultraviolet-ray curable resin composition 3 in the support member 2 of the splicing means 1.

The connection of conductors thus coated was subjected to the same evaluation test as in Example 7, the results of which are as shown in Table 4.

TABLE 4

| | Example | | |
|---|---|---|---|
| | 7 | 8 | 9 |
| Conditions for Ultraviolet Ray Irradiation | | | |
| Preliminary Irradiation | — | — | 41.8 mV/cm² 1 sec |
| Regular Irradiation | 112 mV/cm² 8 sec | " | 41.8 mV/cm² 1 sec |
| Workability | 1–2 sec | " | 14–20 sec |
| Mechanical Strength | 9.6 kgf | " | 9.2 kgf |
| Sealability | good | good | good |

EXAMPLE 10

A coating unit for a connection of wires was formed by filling the interior of a support member with a foamed hot-melt. The support member, hot melt, application method, and the connection of wires used, are as follows.

(Support Member)

The same support member as in Example 1 was used.

(Hot-Melt)

As the sealant 3 there was sued an ethylene vinyl acetate polymer (trade name: TBX-36-122, a product of Three Bond Co.).

(Application Method)

Using a foamed hot melt applicator (FM 151, a product of NORDSON INC., U.S.A.), nitrogen gas was mixed into the hot-melt and then the hot-melt with gas was charged about 1.6 to 1.7 cc into the recess 6 of each shell half 5 of the support member 2 at a temperature of 130° C. and a foaming ratio of 1.5× to form a splicing means 1.

Then, a connection of conductors was embedded in the splicing means 1 thus formed.

As the connection there was used a connection of the same wires (TR 64×10, a product of Shinagawa Densen K. K.) as those used in Example 7. Insulating layers of polyvinyl chloride on the tip end portions of two such wires were cut out about 10 mm and the resulting open wire portions were bonded together by soldering or by electric heat welding to form such Y-shaped connection 9 as shown in FIG. 5.

The Y-shaped connection 9 was embedded into the foamed hot-melt 3 charged in one shell half 5 of the support member 2 and then the other shell half 5 serving as a lid portion of the support member 2 was closed, allowing the hot-melt agent to get into gaps formed in the connection 9.

The following results were obtained. Workability: 1-2 seconds, Fluidity of the pushed-away portion: non, Mechanical strength: 8.0 kgf, Sealability: good.

As set forth hereinabove, by using the coating unit of the present invention for splicing electric wires for example it becomes possible to perform the sealing and coating operation quickly in the means of second and so the workability is improved.

Moreover, the coating unit of the invention is superior in airtightness, capable of coming into close contact with a connection of conductive wires, and has improved sealability which permits complete waterproofing and protection of the connection of conductive wires. For example, in the case where the splicing means of the invention is applied to a connection of wires which constitute a wire harness, the extended distance of the conductors is reduced, whereby the reduction of weight and effective utilization of space can be attained.

Besides, it is possible to attain high mechanical strength and binding strength, and improvement can be made in both weathering resistance and insulating property.

Further, in the case where a jellied ultraviolet-ray curable resin is used as the sealant, it is employable even in a high temperature atmosphere of 120° C. or so, and open time is long; besides, the resin does not flow out even when charged into the support member, thus resulting in improvement of the working efficiency.

Moreover, in the case of using a foamed hot-melt as the sealant, this is more economical, does not require any other special tool than a foamed hot melt applicator and so applicable to connections of conductors of various shapes and sizes; besides, it is not necessary to make temporary fixing.

Additionally, in the case of using a cured silicone gel as the sealant, there are attained stability in a wide temperature range ($-55°$ C. to $+180°$ C.), high sealability based on high thickness (35 kg/cm$^2$ relative to acryl), and stability of electrical characteristics, whereby it is possible to maintain good weathering resistance and insulating property of a connection of wires.

What is claimed is:

1. An apparatus for splicing and sealing plural wires which comprises a support member and a flexible sealant held in the interior of the support member, said flexible sealant comprising a gel of a photocurable resin.

2. The apparatus as set forth in claim 1, wherein said wires are conductive wires.

3. The apparatus as set forth in claim 1, wherein said support member has a shell structure.

4. The apparatus as set forth in claim 1, wherein said support member is a cylindrical body having a slit formed therein.

5. The apparatus as set forth in claim 1, wherein said support member is a U-shaped, closed-end connector made of a thermoplastic resin.

6. The apparatus as set forth in claim 1, wherein said support member is a thermoplastic sheet.

7. A method for sealing a connection of plural wires comprising placing said connection of plural wires in a flexible sealant, said flexible sealant held in the interior of a support member and said flexible sealant comprising a gel of a photocurable resin.

8. The method as set forth in claim 7 comprising the further step of curing said photocurable resin.

9. The method as set forth in claim 8 wherein said step of curing said photocurable resin is carried out by light irradiation.

10. The method as set forth in claim 9 wherein said light irradiation is ultraviolet light irradiation.

11. The method as set forth in claim 7 wherein said wires are conductive wires.

12. The method as set forth in claim 7 wherein said support member has a shell structure.

13. The method as set forth in claim 7 wherein said support member is a cylindrical body having a slit formed therein.

14. The method as set forth in claim 7 wherein said support member is a U-shaped, closed-end connector made of a thermoplastic resin.

15. The method as set forth in claim 7 wherein said support member is a thermoplastic sheet.

* * * * *